June 7, 1927.
F. H. HEHEMANN
1,631,414
VALVE
Filed Jan. 25, 1926
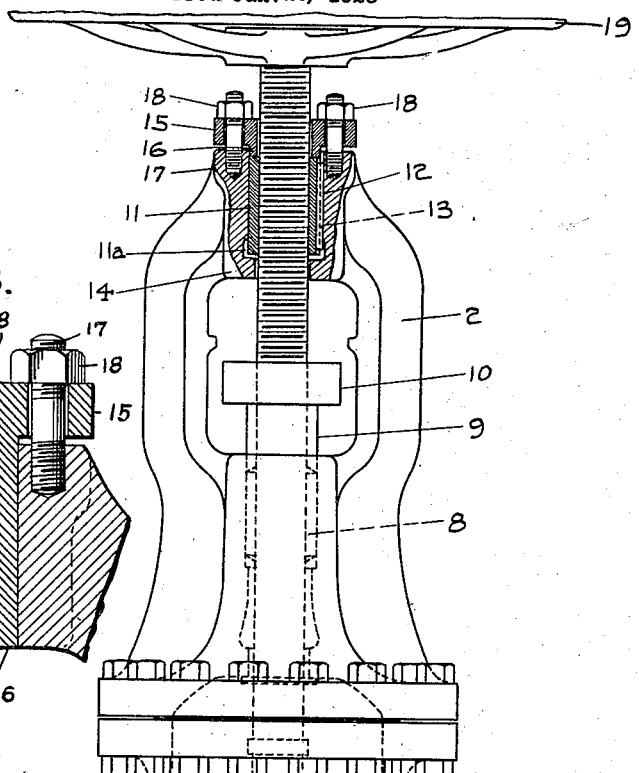
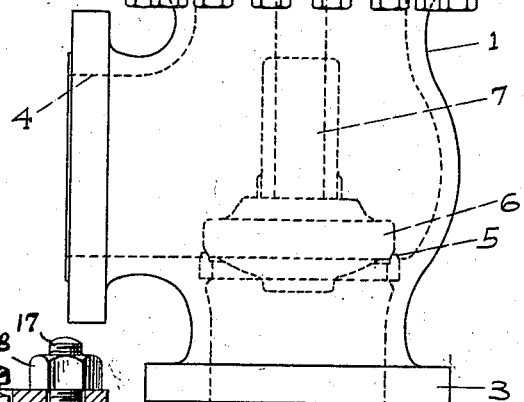
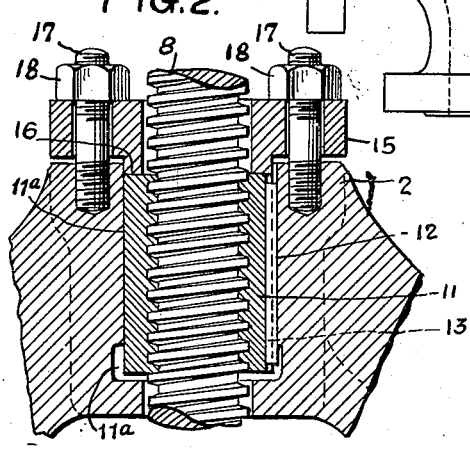
INVENTOR
Frederick H. Hehemann
BY
Allen & Allen
ATTORNEYS Patented June 7, 1927.

1,631,414

UNITED STATES PATENT OFFICE.

FREDERICK H. HEHEMANN, OF CINCINNATI, OHIO, ASSIGNOR TO THE LUNKENHEIMER COMPANY, OF CINCINNATI, OHIO, A CORPORATION OF OHIO.

VALVE.

Application filed January 25, 1926. Serial No. 83,513.

My invention relates to the general class of valves and particularly to a valve having a novel stem bushing adapted to act as an auxiliary closing means cooperating with the stem of the valve for tightly forcing the valve into engagement with its seat.

It is the object of my invention to provide a valve having a bushing which may, by the adjusting effect of the securing means with which the bushing is secured to the body of the valve, act as an auxiliary means to force the closing element of the valve against the seat and the securing means acts as a means for controlling the extent of slidable movement of said bushing. Broadly my invention has for its object the provision of a valve for high pressure work which will have an improved mechanism for closing the valve cooperating with the stem on which the valve closing element is mounted.

Stop valves of the globe and angle types and non-return valves have a valve disc which is mounted on a stem which extends out through a yoke. A handwheel is provided for the stem and the stem is threaded through a bushing permanently mounted in the yoke. The only means of tightening the valve or closing it, is by turning the handwheel with or without such additional torque as may be applied by means of a wrench. With handwheels, even if wrenches are used on them, it is impossible to close the valve against leakage when pressure is taken below the disc, due to the inefficiency of the large screw thread on the stem, so that for use in combination with boilers and other pressure containing vessels, it is of considerable importance that some type of valve be provided which may be closed tightly.

As most boilers are in series with pipe lines leading to steam mains and as each boiler must be adapted to be cut off from the main for cleaning, or necessary repairs and testing, the provision of a valve which will be so constructed that it may be readily and positively closed is a contribution to the art of steam engineering of no small importance.

Particularly in testing boilers where the pressure is run up to a fifty percent overload, even with the valve in perfect condition, it is impossible to close the valve against leakage. This defect is due to the inefficiency of the large screw thread on stem; the thrust produced in turning the handwheel even with such additional force as may be obtained in applying wrenches to the handwheel is not adequate to securely close the valve against leakage, and it often requires the boiler lines to be entirely disconnected and blanked off so that my improved valve is of specific importance in boiler testing.

I have illustrated my improved valve structure in a yoke safety non-return globe valve, although other types of valves may be made utilizing the same constructive principle.

Referring to the drawings:—

Figure 1 is a side elevation of a valve with the inner structure indicated in dotted lines.

Figure 2 is a vertical section, on a considerably larger scale than is shown in Figure 1, of the cut-away portion shown in section in Figure 1.

Figure 3 is a sectional view of a modified form of bushing and clamping plate.

I have illustrated the valve having the body 1 onto which is bolted the yoke 2. The valve body is of angle type having an inlet aperture 3 and outlet aperture 4. The valve seat 5 is disposed within the body in the usual manner and the valve disc 6 mounted on the stem 7 is adapted, with the turning down of the stem or the non-rotative lowering of the stem as illustrated to bear against the seat and thus close the valve.

The stem is packed by the insertion of packing 8 which is held about the stem by the gland 9 which is adjusted by means of a gland nut 10. In the preferred form illustrated in Figures 1 and 2, in the upper portion of the yoke the interiorly threaded stem bushing 11 is slidably mounted in an aperture 11$^a$ extending through the yoke and secured in non-rotative position by a key 12 seated in a keyway 13 in the bushing and the inner wall of the yoke. A shoulder 14 in the aperture limits the downward movement of the bushing. The bushing is retained against or limited in its upward movement by a clamping plate 15 which has an extended lower portion 16 which extends within the aperture 11$^a$ and bears against the upper face of the bushing. The clamping plate may be secured to the yoke in any desirable manner. I have shown the clamping plate as adjustably mounted on studs 17 on which nuts 18 are secured so that the clamping plate may be tightened down against the upper face of the yoke or loosened as desired.

In the modification shown in Figure 3, I have dispensed with the bushing 11 and have extended the lower portion 16 of the plate 15 so that it replaces the bushing 11 and may be made integrally. This modification also dispenses with the key.

The operation of securely closing the valve is accomplished as follows:—The engineer in closing the valve first backs off the nuts 18 so that the bushing 11 (as shown in Figures 1 and 2 or the end of the extended portion of the plate 16 as indicated in Figure 3) may move upwardly a fraction of an inch, with the rotation of the hand wheel 19. In actual practice the valves are shipped out with the nuts 18 down tight. The nuts 18 are backed off two turns and the handwheel is then turned toward the closed position enough to raise the bushing and clamping plate, or the clamping plate, if the modification shown in Figure 3 is employed, so that the upper face of the clamping plate bears on the bottom of nuts as shown in Figure 3. The nuts 18 are then turned back toward their original position and the bushing or plate carrying the valve stem non-rotatably forces the valve disc against the seat with sufficient force to more than balance the upward force of the pressure acting on the disc. The valve is then very positively closed and leakage through it will be highly improbable. The operation of fastening down the adjustment nuts 18 is greatly facilitated if each nut is turned a part of a turn in succession thus avoiding binding of the clamping plate. In opening the valve after it has been closed, the plate is first released and then the handwheel used to open the valve.

As noted the construction of clamping device may be varied. The bushing and clamping plate may be made integrally as shown in Figure 3. It will further be obvious that cap screws or other well known types of clamping devices may be employed in place of the studs with nuts, the advantage of cap screws being that they avoid the possibility of nuts turning clear off the studs.

Having thus described my invention, what I claim is new and desire to secure by Letters Patent, is:—

1. In combination with a valve having a stem, a valve casing, a bushing having internal threads, and the stem having threads engaging those of said bushing, said bushing slidably mounted in the casing with clamping members for controlling the extent of slidable movement of the bushing.

2. In a valve having a valve closing member, a valve casing having a seat for the member, a stem for controlling the movement of the closing member, a bushing mounted in the casing, said stem mounted for progressive movement in threads in said bushing, said bushing slidably mounted in said casing, and a clamping means on said casing adapted to bear against an end of said bushing.

3. In combination with a valve having a stem, a valve casing, a bushing having internal threads, and the stem having threads engaging those of said bushing, said bushing slidably mounted in the casing with clamping means for controlling the extent of slidable movement of the bushing, and a plurality of members independently operable to actuate said clamping means.

FRED. H. HEHEMANN.